United States Patent [19]

Yoshioka et al.

[11] 4,386,172
[45] May 31, 1983

[54] WATER-SWELLABLE COMPOSITION AND LEAKAGE PREVENTING MATERIAL THEREWITH

[75] Inventors: Yoshihiro Yoshioka; Hiroshi Harima, both of Hasaki; Motokazu Nishimura, Yono, all of Japan

[73] Assignees: Kurary Isoprene Chemical Co., Ltd., Ibaraki; C. I. Kasei Co., Ltd., Tokyo, both of Japan

[21] Appl. No.: 264,564

[22] Filed: May 18, 1981

[30] Foreign Application Priority Data

May 30, 1980 [JP] Japan ................................. 55/72560

[51] Int. Cl.$^3$ .............................................. C08K 5/15
[52] U.S. Cl. .................................................. 523/408
[58] Field of Search .................. 260/29.7 B, 29.7 NR; 525/108; 523/408

[56] References Cited

U.S. PATENT DOCUMENTS 4,155,957  5/1979  Sasayama ...................... 260/30.4 R
4,162,240  7/1979  Hino .............................. 260/29.7 B

FOREIGN PATENT DOCUMENTS 2410728  4/1975  Fed. Rep. of Germany ...... 525/108
47-93451  2/1972  Japan .

OTHER PUBLICATIONS

Handbook of Thermoplastic Elastomers, pp. 248, 249.

*Primary Examiner*—Joseph L. Schofer
*Assistant Examiner*—N. Sarofim
*Attorney, Agent, or Firm*—Brisebois & Kruger

[57] ABSTRACT

The invention provides a novel water-swellable polymeric composition useful as a leakage-preventing material filling an interstice, for example, in a concrete body or at a pipe joint. The polymeric composition comprises (a) a hydrophilic or water-soluble polymer having carboxyl groups in the molecule, (b) a water-soluble epoxy compound having at least two epoxy groups per molecule and (c) a rubbery polymer as blended with the components (a) and (b) in the form of an aqueous dispersion, e.g. a rubber latex, having been dried and subjected to a heat treatment, preferably, as impregnating a fibrous core material.

11 Claims, 2 Drawing Figures

WATER-SWELLABLE COMPOSITION AND LEAKAGE PREVENTING MATERIAL THEREWITH

BACKGROUND OF THE INVENTION

The present invention relates to a water-swellable composition and a leakage-preventing material therewith capable of swelling by absorbing water and preventing leakage of water by clogging or filling interstices.

In public works and civil engineering construction works, cracks, cleavages or interstices often form in the places where mortar or concrete has been placed or wherein water-supplying pipes are jointed, and not rarely make a cause of leakage of water. In the prior art, such cracks or interstices are filled with a leakage-preventing material based on rubber, plastics and bitumen, such as rubber packing materials, rubber sealants and bitumen jointing materials. During the use for a long period of time, there may sometimes take place resumed leakage of water in the place due to the deterioration of the leakage-preventing material per se or change in size of the interstices filled with the material. A leakage-preventing material based on a water-swellable polymeric composition has been proposed which can be swelled with the passing out water and can more tightly fill the interstices. Leakage-preventing materials of this type are effective in overcoming the above mentioned drawbacks of the traditional materials of mere caulking type if the water-swellable material has a sufficiently high swelling ratio as well as a high mechanical strength of the swollen gel.

As an example of such a type of water-swellable polymeric compositions, there have been disclosures in the U.S. Pat. Nos. 4,155,957 and 4,211,851, according to which the polymer composition comprises a copolymer of a lower olefin and maleic anhydride, an aqueous emulsion of an acrylic polymer having compatibility with the above copolymer and a compound having, in a molecule, at least two functional groups selected from the class consisting of hydroxy, amino and epoxy groups.

The above described water-swellable polymeric composition or leakage-preventing material is indeed effective to be swelled with water and to exhibit the desired effect when the ionic strength of the water coming into contact therewith is low or, in other words, the water contains very little amounts of electrolyte materials dissolved therein. When the water contains considerable amounts of cations of, for example, sodium, calcium, iron and the like, on the other hand, the polymeric composition can be swelled only insufficiently or sometimes dissolved in the water so that no satisfactory effect of leakage prevention is obtained.

SUMMARY OF THE INVENTION

Thus, it is an object of the present invention to provide a novel and improved water-swellable polymeric composition capable of being swollen even when the water in contact therewith contains considerable amounts of cations to give a gelled mass having high mechanical strengths.

Another object of the invention is to provide a novel and improved leakage-preventing material formed with the above water-swellable polymeric composition and a method of preventing leakage of water by use thereof.

The present invention provides a water-swellable polymeric composition comprising (a) a hydrophilic polymer having carboxyl groups in the molecule in the form of the free acid or in the form of an alkali metal or ammonium salt, (b) a water-soluble epoxy compound having at least two epoxy groups in a molecule, and (c) an aqueous dispersion of a rubbery polymer, as uniformly blended together and having been dried and subjected to a heat treatment.

In formulating the above described water-swellable polymeric composition, the components (b) and (c) are used preferably in amounts of 0.5 to 30 parts by weight and 20 to 150 parts by weight as solid, respectively, per 100 parts by weight of the component (a).

In practicing the leakage prevention with the above water-swellable polymeric composition, the interstices may be filled with the composition as such but it is recommendable that a fibrous core material such as woven or non-woven fabrics or fiber rovings is impregnated with the blend of the above components (a), (b) and (c) followed by drying and heat treatment so as that a leakage-preventing material having larger mechanical strengths is obtained to fill the interstice.

BRIEF DESCRIPTION OF THE DRAWING

FIG. 1 is for an inventive material (see Example 1) and FIG. 2 is for a conventional material (see Comparative Example 1).

Figure 1:
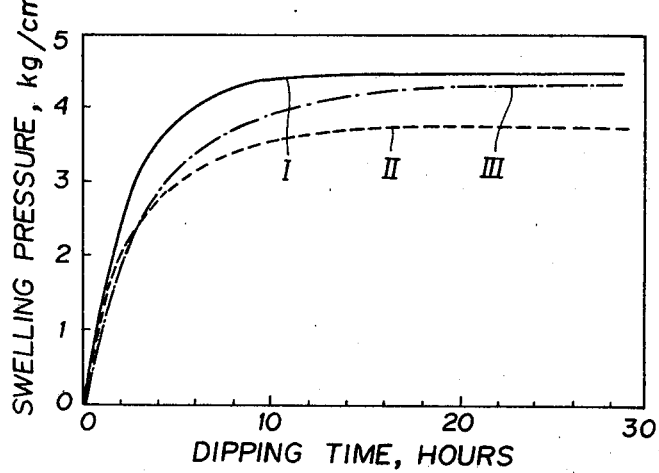
FIGS. 1 and 2 are each a graphic showing of the relationship between the dipping time of a water-swellable leakage-preventing material and the swelling pressure produced thereof.

Curves I: dipping in pure water
Curves II: dipping in a 3.5% aqueous solution of sodium chloride
Curves III: dipping in a 2.5% aqueous dispersion of calcium hydroxide

DETAILED DESCRIPTION OF THE PREFERRED EMBODIMENTS

The hydrophilic polymer as the component (a) in the inventive composition is a polymer having carboxyl groups in the molecule or a polymer having functional groups convertible to carboxyl groups when reacted with water or an alkaline compound either in the form of the free carboxylic acid or in the form of an alkali metal or ammonium salt. Suitable polymers include:

(1) homopolymers obtained by the polymerization of a monomer having at least one carboxyl group in a molecule such as acrylic acid, methacrylic acid, crotonic acid, itaconic acid and monoesters thereof, fumaric acid and monoesters thereof, maleic acid and monoesters thereof, citraconic acid and monoesters thereof, mesaconic acid and monoesters thereof and the like as well as copolymers obtained by the copolymerization of one or more of the above named monomers with other ethylenically unsaturated monomers such as styrene and derivatives thereof, α-olefins, cyclohexene, vinyl halides, vinyl or allyl esters of saturated carboxylic acids, acrylamide, acrylonitrile, methacrylonitrile, vinyl- or allylalkyl ethers, esters of acrylic acid, esters of methacrylic acid, esters of crotonic acid, diesters of fumaric acid, diesters of maleic acid and the like;

(2) polymers of those monomers having functional groups convertible to carboxyl groups by hydrolysis or saponification with an alkali such as maleic anhydride, citraconic anhydride, itaconic anhydride, acrylamide, acrylonitrile, methacrylonitrile, esters of acrylic acid, esters of mathacrylic acid, esters of crotonic acid, diesters of maleic acid, diesters of fumaric acid and the like and copolymers containing one or more of the above named monomers as well as hydrolysis products or alkali spaonification products thereof; and (3) polymers into which carboxyl groups have been introduced by the reaction of etherification, esterification, acetalization and the like on the reactive functional groups at the side chains of the polymer such as oxalic acid esters, glycolic acid esters and glyoxalic acid acetals of polyvinyl alcohols as well as carboxymethyl celluloses.

Among the above named polymers, particularly suitable in the present invention are copolymers of maleic anhydride with an α-olefin such as ethylene, propylene, isobutylene, diisobutylene and the like, copolymers of maleic anhydride with a vinylic monomer such as vinyl acetate, styrene, methylvinyl ether and the like and polymers of acrylic acid. The copolymers of maleic anhydride with an α-olefin are the most preferred. Especially suitable is a copolymer of maleic anhydride and isobutylene in which these two kinds of the monomer units are alternately linked together.

When the polymer as the component (a) is a copolymer of carboxyl-containing monomer units with monomer units without carboxyl groups, the ratio of the former to the latter should be such that the polymer is water-soluble at least when it is in the salt form. Although largely dependent on various parameters, the polymer contains preferably at least 10% by weight or, more preferably, from 30 to 85% by weight of the carboxyl-containing monomer units. When the polymer as the component (a) is insufficiently water-soluble, blending of the component (a) with the components (b) and (c) may be carried out with admixture of a small amount of an alkaline material such as caustic alkalis, e.g. sodium and potassium hydroxides, alkali carbonates, e.g. sodium and potassium carbonates, ammonia, ammonium carbonate, alkali acetates, e.g. sodium and potassium acetates, ammonium acetate and organic amines either alone or in combination of two kinds or more so as that at least part of the carboxyl groups are converted to the salt form and the polymer is imparted with increased solubility in water.

The second component, (b), used in the inventive composition is a water-soluble epoxy compound having at least two epoxy groups in a molecule. It is not required that the compound is freely miscible with water but the compound has a solubility in water such that, when 10 parts by weight of the compound is added into 90 parts by weight of water at 25±3° C., at least 80% or, preferably, at least 85% of the compound is dissolved in the water. When the water-solubility of the epoxy compound is smaller than above, the resultant water-swellable composition has a relatively large solubility in water not to exhibit satisfactory leakage-preventing effects.

Suitable examples of the water-soluble epoxy compounds as the component (b) include di- or triglycidyl ethers of polyvalent alcohols such as di- and triglycidyl ethers of glycerin, ethyleneglycol diglycidyl ether, polyethyleneglycol diglycidyl ether, propyleneglycol diglycidyl ether, polypropyleneglycol diglycidyl ether and the like and glycidyl esters of compounds having at least two carboxyl groups in a molecule which may be the same ones as given above as the examples of the carboxyl-containing polymers as the component (a). Polyepoxy compounds having lower solubility in water are not suitable in the present invention such as epoxy resins obtained from cyclohexene, diglycidyl ether of bisphenol A, alicyclic epoxy resins, nitrogen-containing epoxy resins, polybutadiene type epoxy resins, urethane-modified epoxy resins, metal-containing epoxy resins and the like.

The third component, (c), used in the preparation of the inventive water-swellable composition is an aqueous dispersion or a latex of a rubbery polymer. The rubbery polymer should have a glass transition temperature not higher than −15° C. or, preferably, not higher than −30° C. Suitable polymers are exemplified by natural rubber, polyisoprene rubbers, polybutadiene rubbers, styrene-butadiene copolymeric rubbers, chloroprene rubbers, acrylonitrile-butadiene copolymeric rubbers, styrene-isoprene copolymeric rubbers, ethylene-propylene copolymeric rubbers and the like. Among them, copolymeric rubbers of styrene with a dienic monomer such as butadiene or isoprene are particularly preferred. These polymers should be used in the form of a latex or emulsion containing, for example, from 40 to 60% by weight of the polymer as prepared by the emulsion polymerization in an aqueous medium.

The above given limitation of the glass transition temperature of the polymer in the component (c) is important. For example, an aqueous emulsion of a copolymer of 25% by weight of ethylene and 75% by weight of vinyl acetate having a glass transition temperature of about −10° C. cannot give a satisfactory water-swellable composition capable of exhibiting a sufficiently high swelling ratio in water and hence good leakage preventing power.

In formulating the inventive composition, 100 parts by weight of the component (a) are blended with 0.5 to 30 parts by weight or, preferably, 5 to 20 parts by weight of the water-soluble epoxy compound as the component (b) and the aqueous dispersion of the polymer as the component (c) in an amount from 20 to 150 parts by weight or, preferably, from 50 to 120 parts by weight calculated as solid. When the amount of the component (b) is smaller than above, the resultant water-swellable composition has an excessively large solubility in water due to the deficiency in crosslinks while a larger amount of the component (b) than above results in an insufficient swelling ratio of the composition in water. When the amount of the component (c) is smaller than above, on the other hand, the resultant water-swellable composition is relatively fragile and should be handled with care while a larger amount of the component (c) than above has a similar effect to that with an excessively large amount of the component (b).

In addition to the above described essential components (a), (b) and (c), the inventive water-swellable composition may be prepared with optional addition of other ingredients such as plasticizers, aging retarders, dyes, pigments, fillers and the like according to need.

Whereas an adhesive composition composed of the components similar to the components (a), (b) and (c) in the invention is already disclosed in Japanese Patent Disclosure 49-93451, the inventive water-swellable composition is more fully distinguished from the above mentioned adhesive composition by the preparation procedure described below.

Thus, in the first place, the hydrophilic polymer as the component (a) is dissolved in a suitable volume of water. In this case, the polymer may be dissolved as such when it is in a form of an alkali metal salt or ammonium salt. If not, the water-solubility of the polymer is desirably improved by converting at least part of the carboxyl groups into the salt form by adding a caustic alkali, e.g. sodium or potassium hydroxide, or ammonia in an amount of 20 to 120% by moles based on the carboxyl groups in the polymer.

Next comes the addition of the components (b) and (c) to the above prepared aqueous solution of the component (a) in the respective desired amounts followed by blending to give a uniform aqueous mixture. The thus obtained uniform aqueous blend is then preliminarily dried and subjected to a heat treatment to give a water-swellable composition of the invention. The heat treatment of the preliminarily dried composition, which preferably contains 30 to 50% by weight of water per completely dry solid, is carried out at a temperature in the range from 80° to 150° C. for from 5 to 300 minutes or, preferably, from 80° to 110° C. for from 30 to 300 minutes. This heat treatment is essential and the above given conditions of temperature and time are rather critical in order to obtain satisfactory water-swellability of the resultant composition suitable for use as a leakage-preventing material. If the heat treatment is carried out insufficiently, the resultant composition has no sufficient swelling ratio in water in addition to the inferior mechanical strengths of the swollen gel and the relatively high solubility of the swollen gel in water containing metal ions. On the other hand, a heat treatment carried out to an excessive extent may result in a too large density of crosslinks and further in the thermal degradation of the polymeric components in the composition so that no satisfactory water-swellable composition is obtained.

The inventive water-swellable composition obtained by drying and heat-treating the aqueous blend of the components (a), (b) and (c) as such may be used as a leakage-preventing material if the interstices at which water leakage should be prevented are very narrow. It is preferable, however, that a fibrous core material such as woven or non-woven fabrics and yarns or rovings as well as papers is impregnated with the aqueous blend of the components (a) to (c) followed by drying and heat-reatment of the material impregnated with the polymeric composition in the manner described above so as that the resultant leakage-preventing material has much higher mechanical strengths than without the core material. The pick-up amount of the polymeric composition on the core material should be determined according to particular applications of the leakage-preventing material.

Following are the examples and comparative examples to illustrate the present invention in further detail but not to limit the scope of the invention in any way.

EXAMPLE 1

An aqueous blend was prepared by uniformly dissolving and mixing 100 parts by weight of a copolymer of isobutylene and maleic anhydride solubilized by modification with ammonia (Isobam-110, a product by Kuraray Isoprene Chemical Co., Japan), 8 parts by weight of a water-soluble epoxy compound (Denacol EX-313, a product by Nagase Sangyo Co., Japan) having a solubility of 99% at 25° C. when 10 parts by weight thereof were added to 90 parts by weight of water and 200 parts by weight of a latex containing 50% by weight of a copolymeric rubber of styrene and isoprene having a glass transition temperature of about −35° C. (Kuraprene SIR-200, a product by Kuraray Isoprene Chemical Co., supra) in 300 parts by weight of water. A polyester non-woven fabric having a basis weight of 130 g/m$^2$ was coated with the thus prepared aqueous blend to have a pick-up amount of the polymeric material of about 1800 g/m$^2$ as dried followed by drying at 90° C. for 15 minutes and heat-treatment at 100° C. for 60 minutes to give a sheet material of about 3 mm thickness.

Pieces of each 2 cm×2 cm square were cut from this sheet material. Each of the pieces was placed on the bottom of a stainless steel vat containing a test liquid and sandwiched with a stainless steel plate mounted to the crosshead of a compression testing machine and kept 3 mm apart from the bottom of the vat so as that, when the test piece became swollen by the test liquid, the stainless steel plate received an upward compressive force which could be measured in the testing machine and recorded as the swelling pressure. The test liquid was either pure water, a 3.5% aqueous solution of sodium chloride or a 2.5% aqueous slurry of calcium hydroxide. The results of the swelling pressures obtained by dipping in the above described manner for up to 30 hours were as shown in FIG. 1 by the curves I, II and III for each of the above mentioned test liquids, respectively.

As is clear from these results, the swelling pressure increases rapidly and levels off within 10 hours or less while being kept constant thereafter regardless of the presence or absence of the electrolyte in the test liquid.

COMPARATIVE EXAMPLE 1

The experimental procedure was substantially the same as in Example 1 except that the aqueous blend used for impregnating the polyester non-woven fabric was prepared by dissolving and mixing 100 parts by weight of the same copolymer of isobutylene and maleic anhydride, 100 parts by weight of a polyethyleneglycol (PEG #200, a product by Nippon Yushi Co., Japan) and 100 parts by weight of an aqueous emulsion containing 50% by weight of a copolymer of ethylene and vinyl acetate having a glass transition temperature of about −10° C. (Evadic EP-11, a product by Dai-Nippon Ink Kagaku Co., Japan) in 300 parts by weight of water.

Figure 2:
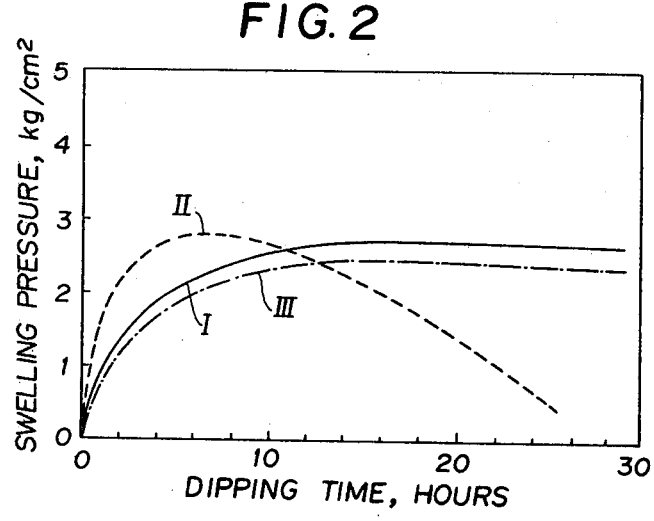

The results of the testing for the swelling pressure undertaken with the thus prepared sheet material are illustrated in FIG. 2 by the curves I, II and III for the testing liquids of pure water, a 3.5% aqueous solution of sodium chloride and a 2.5% aqueous slurry of calcium hydroxide, respectively. As is clear from this figure, the swelling pressure is in general lower than with the sheet material prepared in Example 1 and unexpectedly the swelling pressure in the calcium hydroxide slurry showed a remarkable decline after about 6 to 7 hours of dipping.

EXAMPLE 2

Aqueous blends were prepared each by first dissolving 100 parts by weight of a copolymer of isobutylene and maleic anhydride (Isobam-10, a product of Kuraray Isoprene Chemical Co., supra) in 525 parts by weight of an aqueous solution containing 25 parts by weight of sodium hydroxide followed by dissolving and admixing of 145 parts by weight of a latex containing 69% by weight of a copolymeric rubber of styrene and butadiene having a glass transition temperature of about −45° C. (JSR #0561, a product by Japan Synthetic Rubber Co., Japan) and 10 parts by weight of the same epoxy compound as used in Example 1 (Denacol EX- 313) or a water-soluble epoxy compound having a solubility of 80% at 25° C. when 10 parts by weight thereof were added to 90 parts by weight of water (Denacol EX-314, a product by Nagase Sangyo, supra).

Preparation of the sheet materials was carried out in the same manner as in Example 1. The results of the swelling pressure measurement were: 4.8 kg/cm² and 3.5 kg/cm² for the compositions prepared with Denacol EX-313 and Denacol EX-314, respectively, after 24 hours of dipping in pure water.

COMPARATIVE EXAMPLE 2

The experimental procedure was substantially the same as in Example 2 except that the epoxy compound had a solubility in water of 75% at 25° C. at the same standard (Epon 812, a product by Shell Chemical Co., U.S.A.). The result of the swelling pressure measurement was only 1.2 kg/cm² after 24 hours of dipping in pure water. This result supports the criticality of the solubility of the epoxy compound in water in order that the water-swellable material prepared with the composition may have a sufficiently high swelling pressure.

EXAMPLE 3

A water-swellable sheet material was prepared in about the same manner as in Example 1 using an aqueous blend prepared by dissolving and mixing 100 parts by weight of a polyacrylic acid in a sodium salt form (Aronbis S, a product by Nippon Junyaku Co., Japan), 8 parts by weight of a water-soluble epoxy compound having a solubility of 95% at 25° C. when 10 parts by weight thereof were added to 90 parts by weight of water (Denacol EX-811, a product by Nagase Sangyo, supra) and a latex containing a copolymeric rubber of styrene and butadiene (JSR #0561, supra) in an amount of 100 parts by weight as solid in 500 parts by weight of water.

The swelling pressure measured in pure water at 25° C. undertaken in the same manner as in Example 1 was 4.4 kg/cm² after 24 hours of dipping.

COMPARATIVE EXAMPLE 3

The experimental procedure was substantially the same as in Example 3 except that the rubber latex was replaced with an aqueous emulsion of a copolymer of ethylene and vinyl acetate (Evadic EP-11, supra) in substantially the same amount as solid.

The swelling pressure was 2.1 kg/cm² under the same test conditions as in Example 3 supporting the importance of the glass transition temperature of the polymer added to the composition in the form of an aqueous dispersion.

EXAMPLE 4

Preparation of the water-swellable sheet material was carried out in about the same manner as in the preceding examples using an aqueous blend prepared by first dissolving 100 parts by weight of a copolymer of methylvinyl ether and maleic anhydride (Gantrez AN-139, a product by GAF Corp., U.S.A.) and 25 parts by weight of sodium hydroxide in 500 parts by weight of water followed by dissolving and admixing of 8 parts by weight of the same water-soluble epoxy compound as used in Example 3 (Denacol EX-811), and the same rubber latex as used in Example 2 (JSR #0561) in an amount of 100 parts by weight as solid.

The swelling pressure measured in the same manner as in the preceding examples was 3.9 kg/cm² in pure water at 25° C. after 24 hours of dipping.

EXAMPLE 5

Water leakage preventing power was examined with the water-swellable sheet material prepared in Example 1. The swelling ratio, i.e. the ratio of the weight of the swollen sheet material to the dry weight of the same sheet was 1560% in pure water and 410% in a 2.5% aqueous slurry of calcium hydroxide at 25° C. after 120 hours of dipping.

An annular test piece having an inner diameter of 90 mm and an outer diameter of 150 mm was taken by cutting the 3 mm thick sheet material and the test piece was placed between two flanges kept at a distance of 5 mm in water at 25° C. and, when the test piece became swollen after 24 hours of dipping and a sealed space was formed inside the annular piece with the upper and lower flanges, the water in the space was pressurized through an opening in one of the flanges by means of a pump and the pressure at which the water began to leak out of the space was measured to give a value of 5.0 kg/cm²G.

For comparison, the same test was repeated except that the synthetic rubber latex was replaced by an aqueous emulsion of ethylene-vinyl acetate copolymer having a glass transition temperature of about 0° C. (Panflex OM-4000, a product by Kuraray Co.). The swelling ratio of this comparative sheet material was 1350% or 250% in pure water or a 2.5% aqueous slurry of calcium hydroxide, respectively, at 25° C. and the leakage preventing power was 1.0 kg/cm²G.

What is claimed is:
1. A water-swellable polymeric composition which comprises
   (a) a hydrophilic polymer having carboxyl groups in the molecule in the form of a free carboxylic acid or in the form of an alkali metal or ammonium salt,
   (b) a water-soluble epoxy compound having at least two epoxy groups in a molecule, and
   (c) an aqueous dispersion of a rubbery polymer having a glass transition temperature not higher than −30° C., uniformly blended together and having been dried and heated for 30 to 300 minutes at a temperature in the range of 80° to 110° C.
2. The water-swellable polymeric composition as claimed in claim 1 wherein the hydrophilic polymer as the component (a) is a copolymer of maleic anhydride and an α-olefin.
3. The water-swellable polymeric composition as claimed in claim 2 wherein the α-olefin is isobutylene.
4. The water-swellable polymeric composition as claimed in claim 1 wherein at least 10% by moles of the monomer units of the hydrophilic polymer as the component (a) are carboxyl group-containing monomer units.
5. The water-swellable polymeric composition as claimed in claim 1 wherein the water-soluble epoxy compound as the component (b) is soluble in such an extent that at least 80% thereof is dissolved in water when 10 parts by weight thereof is admixed with 90 parts by weight of water at 25° C.
6. The water-swellable polymeric composition as claimed in claim 1 wherein the aqueous dispersion of a polymer as the component (c) is a latex of a copolymeric rubber of styrene and butadiene or styrene and isoprene.

7. The water-swellable polymeric composition as claimed in claim 1 wherein the amounts of the components (b) and (c) are in the ranges from 0.5 to 30 parts by weight and from 20 to 150 parts by weight as solid, respectively, per 100 parts by weight of the component (a).

8. A leakage-preventing material which comprises
(a) a fibrous core material, and
(b) a water-swellable polymeric composition comprising
  (i) a hydrophilic polymer having carboxyl groups in the molecule in the form of free carboxylic acid or in the form of an alkali metal or ammonium salt,
  (ii) a water-soluble epoxy compound having at least two epoxy groups in a molecule, and
  (iii) an aqueous dispersion of a rubbery polymer having a glass transition temperature not higher than −30° C., uniformly blended together to form an aqueous blend, said fibrous core material being impregnated with the aqueous blend and subjected to drying and heat treatment.

9. A method for preventing leakage of water from and interstice which comprises filling or covering the interstice with a water-swellable polymeric composition comprising
(a) a hydrophilic polymer having carboxylic groups in the molecule in the form of the free carboxylic acid or in the form of an alkali metal or ammonium salt,
(b) a water-soluble epoxy compound having at least two epoxy groups in a molecule, and
(c) an aqueous dispersion of a rubbery polymer having a glass transition temperature not higher than −30° C., uniformly blended together and having been dried and subjected to a heat treatment.

10. The method as claimed in claim 9 wherein the water-swellable polymeric composition having been dried and subjected to a heat treatment is carried by a fibrous core material.

11. The water-swellable polymeric composition as claimed in claim 1 wherein the rubbery polymer of component (c) is selected from the class consisting of natural rubber, polyisoprene rubbers, polybutadiene rubbers, styrene-butadiene copolymeric rubbers, chloroprene rubbers, acrylonitrile-butadiene copolymeric rubbers, styrene-isoprene copolymeric rubbers, and ethylene-propylene copolymeric rubbers.

* * * * *